Patented Oct. 13, 1931

1,827,691

UNITED STATES PATENT OFFICE

NORBERT SPECHT, OF ORANIENBURG, NEAR BERLIN, GERMANY, ASSIGNOR, BY MESNE ASSIGNMENTS, TO KREBS PIGMENT AND COLOR CORPORATION, OF NEWARK, NEW JERSEY, A CORPORATION OF DELAWARE

PROCESS OF TREATING ORES OF TITANIUM CONTAINING CHROMIUM AND RECOVERING THE SULPHURIC ACID

No Drawing. Application filed April 6, 1929, Serial No. 353,259, and in Germany April 14, 1928.

During the recovery of sulphuric acid from impure titanium ores which have been treated with such acid, the impurities, as for instance copper, vanadium, chromium and so on, will collect in the sulphuric acid. It has been discovered that chromium oxide is the worst impurity occurring in titanium ores, and that such chromium oxide will have the most detrimental effect upon the white color of titanium dioxide. According to the present invention, it is necessary to concentrate the sulphuric acid to at least 92 per cent in order to remove chromium oxide. If this is not done the chromium oxide will remain in the cycle of operations and it will gradually become more and more concentrated in the sulphuric acid and affect considerably the quality of the titanic dioxide.

While it is possible to separate to a high degree the other sulfates dissolved in the sulphuric acid, as for instance those of copper, manganese, zinc and iron, even in a materially less concentrated sulphuric acid, such course with ores containing chromium is successful only if the sulphuric acid is concentrated to at least 92 per cent and kept at a temperature of 300 degrees centigrade and more for an extended period, say about an hour or longer, in order to afford the chromium sulfate sufficient time to be converted into a modification which is but poorly soluble, and which therefore can be readily separated as a solid from the liquid by operations such as filtering, decanting or the like.

I claim:

1. The process which consists in treating impure chromium-bearing titanium ores with sulphuric acid, concentrating the resulting impure sulphuric acid to at least 92 per cent, subjecting such concentrated acid to a temperature of about 300 degrees centigrade for an extended period of time, and separating the resulting purified sulphuric acid from the solids.

2. The process which comprises treating impure chromium-bearing titanium ores with sulphuric acid, concentrating the resulting impure sulphuric acid to at least 92 per cent, subjecting such concentrated acid to a temperature of about 300 degrees centigrade for about one hour, and separating the resulting purified sulphuric acid from the solids.

3. In the process of treating impure chromium-bearing titanium ores with sulphuric acid, the steps which consist in concentrating to at least 92 per cent the sulphuric acid remaining after treating said impure chomium-bearing titanium ores with sulphuric acid, subjecting said concentrated acid to a temperature of about 300 degrees centigrade for an extended period of time, and recovering the substantially chromium-free sulphuric acid thus produced.

In testimony whereof I affix my signature.

NORBERT SPECHT.